US010853141B2

(12) United States Patent
El-Moussa et al.

(10) Patent No.: US 10,853,141 B2
(45) Date of Patent: Dec. 1, 2020

(54) RESOURCE PROVISIONING IN DISTRIBUTED COMPUTING ENVIRONMENTS

(71) Applicant: British Telecommunications Public Limited Company, London (GB)

(72) Inventors: Fadi El-Moussa, London (GB); Joshua Daniel, London (GB)

(73) Assignee: British Telecommunications Public Limited Company, London (GB)

( * ) Notice: Subject to any disclaimer, the term of this patent is extended or adjusted under 35 U.S.C. 154(b) by 310 days.

(21) Appl. No.: 15/739,491

(22) PCT Filed: May 23, 2016

(86) PCT No.: PCT/EP2016/061594
§ 371 (c)(1),
(2) Date: Dec. 22, 2017

(87) PCT Pub. No.: WO2017/001117
PCT Pub. Date: Jan. 5, 2017

(65) Prior Publication Data
US 2018/0173568 A1 Jun. 21, 2018

(30) Foreign Application Priority Data
Jun. 29, 2015 (EP) .................................... 15174238

(51) Int. Cl.
*G06F 9/50* (2006.01)
*H04L 29/08* (2006.01)
*G06F 9/46* (2006.01)

(52) U.S. Cl.
CPC .............. *G06F 9/5027* (2013.01); *G06F 9/46* (2013.01); *G06F 9/5061* (2013.01); *G06F 9/5077* (2013.01); *H04L 67/10* (2013.01)

(58) Field of Classification Search
CPC ........ G06F 9/5072; G06F 9/5027; G06F 9/46; G06F 9/5061; G06F 9/5077;
(Continued)

(56) References Cited

U.S. PATENT DOCUMENTS 8,447,851 B1* 5/2013 Anderson ........... G06F 11/3006
709/223
2011/0106515 A1 5/2011 Bhamidipaty et al.
(Continued)

FOREIGN PATENT DOCUMENTS

WO WO 2014/202934 A1 12/2014
WO WO 2017/194637 A1 11/2017
WO WO 2017/194638 A1 11/2017

OTHER PUBLICATIONS

International Search Report for corresponding International Application No. PCT/EP2016/061594 dated Jan. 5, 2017; 4 pages.
(Continued)

Primary Examiner — Todd L Barker
(74) Attorney, Agent, or Firm — Patterson Thuente Pedersen, P.A.

(57) ABSTRACT

A computer implemented method to provide a resource to a virtualized software installation in a distributed computing environment, the method including: receiving a functional requirement for the software installation; determining an extent of the resource required to implement the functional requirement; identifying one or more resource providers in the distributed computing environment having availability of the required resource to the determined extent; and communicating an indication of the identified resource providers to the software installation in order that the resource can be provided to the software installation to the determined extent to provide the functional requirement.

8 Claims, 3 Drawing Sheets

(58) Field of Classification Search
CPC ......... G06F 16/958; G06F 2009/45587; G06F 9/45558; H04L 67/10
See application file for complete search history.

(56) References Cited

U.S. PATENT DOCUMENTS

| | | | |
|---|---|---|---|
| 2012/0185913 A1* | 7/2012 | Martinez | G06F 9/455 726/1 |
| 2012/0198073 A1 | 8/2012 | Srikanth et al. | |
| 2013/0036208 A1 | 2/2013 | Dochez | |
| 2013/0298183 A1 | 11/2013 | McGrath et al. | |
| 2014/0136710 A1 | 5/2014 | Benari et al. | |
| 2014/0280977 A1* | 9/2014 | Martinez | H04L 47/70 709/226 |
| 2016/0110183 A1* | 4/2016 | Fu | G06F 8/65 717/169 |

OTHER PUBLICATIONS

Written Opinion of the International Searching Authority for corresponding International Application No. PCT/EP2016/061594 dated Jan. 5, 2017; 6 pages.

Andreas M. Antonopoulos, Mastering Bitcoin. Unlocking Digital Crypto-Currencies, Early Release Raw & Unedited; First Edition, Dec. 2014, 282 pages, O'Reilly.

Application as filed for U.S. Appl. No. 16/300,169, filed Nov. 9, 2018, Inventor(s): Daniel et al.

Application and Filing Receipt for U.S. Appl. No. 16/300,210, filed Nov. 9, 2018, Inventor(s): Daniel et al.

International Search Report and Written Opinion for PCT Application No. PCT/EP2017/061237 dated Jun. 23, 2017; 10 pages.

International Search Report and Written Opinion for PCT Application No. PCT/EP2017/061238 dated Jun. 7, 2017; 10 pages.

Goldmann, "Resource management in Docker"; 18 pages; https://goldmann.pl/blog/2014/09/11/resource-management-in-docker/ [Retrieved Nov. 8, 2018].

Anonymous, "Docker run reference"; 22 pages. https://docs.docker.com/engine/reference/run/ [Retrievved Nov. 8, 2018].

Docker overview | Docker Documentation "Understanding the architecture" at "docs.docker.com/engine/understanding-docker"; 7 pages; https://docs.docker.com/engine/docker-overview/; [Retrieved Nov. 8, 2018].

* cited by examiner

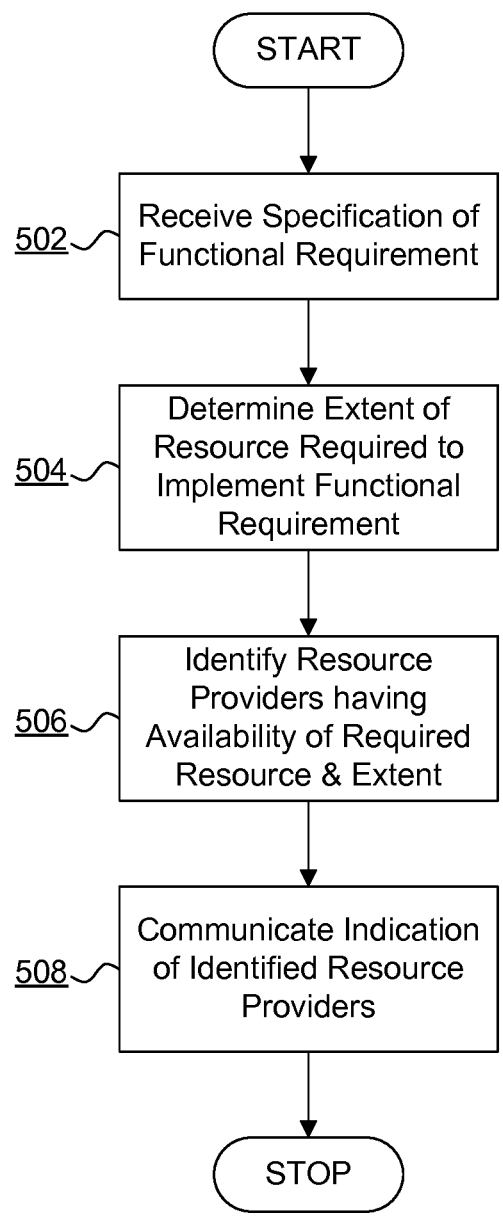

RESOURCE PROVISIONING IN DISTRIBUTED COMPUTING ENVIRONMENTS

CROSS-REFERENCE TO RELATED APPLICATIONS

The present application is a National Phase entry of PCT Application No. PCT/EP2016/061594, filed on May 23, 2016, which claims priority to EP Patent Application No. 15174238.4, filed on Jun. 29, 2015, which are hereby fully incorporated herein by reference.

TECHNICAL FIELD

The present disclosure relates to the provision of resources. In particular it relates to the provision of resources in distributed computing environments.

BACKGROUND

Distributed computing environments are environments in which computer systems, services and/or resources (whether hardware, software or a combination) are distributed physically and/or virtually with a dependence on communications networks for interoperability. Further, there is increasing deployment of software installations such as applications or entire virtualized computer systems to service based environments, such as Infrastructure as a Service (IaaS), Platform as a Service (PaaS) and cloud computing environments.

Software installations such as virtualized computer systems, cloud computing deployments and the like, implement functional requirements as part of the installation. For example functional requirements can include: security functionality such as anti-malware, encryption, firewall or intrusion detection; communications functionality such as network communication, encrypted or otherwise secure communication; operating system services and functions; data storage facilities including disk, memory, database and the like; middleware services such as message handling, transaction handling and the like; and other functional requirements. Functional requirements themselves employ computing resources such as storage, processors, security functions, communication resources such as networking and the like that are increasingly provided by "supplier" or "provider" entities (whether third-party or not) either as actual resources or virtualized resources. Thus in implementing or providing a functional requirement a software installation consumes requisite computing resources from resource providers. The consumption of such resources is increasingly dynamic, on-demand and/or dynamically scalable. Resource providers and consumers in such environments can be unrelated, anonymous, untrusted and/or unknown to each other.

A challenge arises for a resource consumer such as a software installation seeking to implement a functional requirement in that it is necessary to identify resource providers able to accommodate the resource demands of the functional requirement. On the other hand a challenge arises for resource providers such as server or cloud service computer systems in that there is no distinction between the resource requirements of seemingly identical functional requirements where the functional requirements are implemented differently such that one uses more resource than the other. Accordingly resource providers apply a one-size-fits-all approach to resource provision and resource consumers can find that they are over or under provisioned. The challenges are particularly acute where resource consumers seek to change resource consumption characteristics of their functional requirements or change functional requirements altogether, in which case the resource consumption can deviate from a historical norm.

Accordingly it would be beneficial to provide resource provisioning for software installations without the aforementioned disadvantages.

SUMMARY

The present disclosure accordingly provides, in a first aspect, a computer implemented method to provide a resource to a virtualized software installation in a distributed computing environment, the method comprising: receiving a functional requirement for the software installation; determining an extent of the resource required to implement the functional requirement; identifying one or more resource providers in the distributed computing environment having availability of the required resource to the determined extent; and communicating an indication of the identified resource providers to the software installation in order that the resource can be provided to the software installation to the determined extent to provide the functional requirement.

In some embodiments the functional requirement has associated one or more characteristics and determining an extent of a resource required includes: accessing a directory of functional requirement characteristics, the directory defining, for each characteristic, an extent of the resource required to provide a functional requirement having the characteristic.

In some embodiments determining an extent of a resource required includes accessing a directory of functional requirements, the directory defining, for each functional requirement, an extent of the resource required to implement the function.

In some embodiments the functional requirement includes a function of a security policy.

In some embodiments the functional requirement is an entry in a deployment descriptor for one or more software components for execution for the software installation.

In some embodiments identifying resource providers includes: polling one or more resource providers for availability of the resource at each provider; receiving resource availability information from the one or more resource providers; and determining one or more resource providers suitable for providing the resource to the required extent.

In some embodiments identifying resource providers includes sending a request to each of one or more resource providers including an indication of the required resource and the determined extent; and receiving an indication from each of one or more providers that the provider has availability of the required resource to the determined extent.

The present disclosure accordingly provides, in a second aspect, a computer system to provide a resource to a virtualized software installation in a distributed computing environment, the system comprising: a receiver including logic adapted to receive a functional requirement for the software installation; a resource assessor including logic adapted to determine an extent of the resource required to implement the functional requirement; a resource provider identifier including logic adapted to identify one or more resource providers in the distributed computing environment having availability of the required resource to the determined extent; and an interface via which an indication of the identified resource providers is communicated to the software installation in order that the resource can be provided to the software installation to the determined extent to provide the functional requirement.

The present disclosure accordingly provides, in a third aspect, a computer program element comprising computer program code to, when loaded into a computer system and executed thereon, cause the computer to perform the steps of a method as described above.

BRIEF DESCRIPTION OF THE DRAWINGS

An embodiment of the present disclosure will now be described, by way of example only, with reference to the accompanying drawings, in which:

FIG. 5 is a flowchart of an exemplary method of the computer system of FIG. 2 in accordance with an embodiment of the present disclosure.

DETAILED DESCRIPTION

Figure 1:
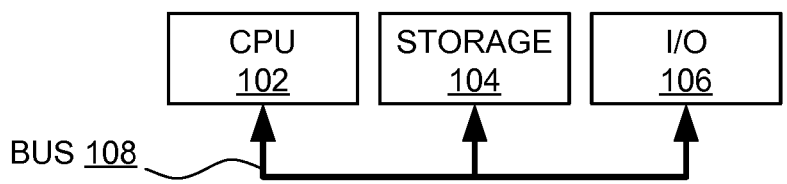
FIG. 1 is a block diagram of a computer system suitable for the operation of embodiments of the present disclosure.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
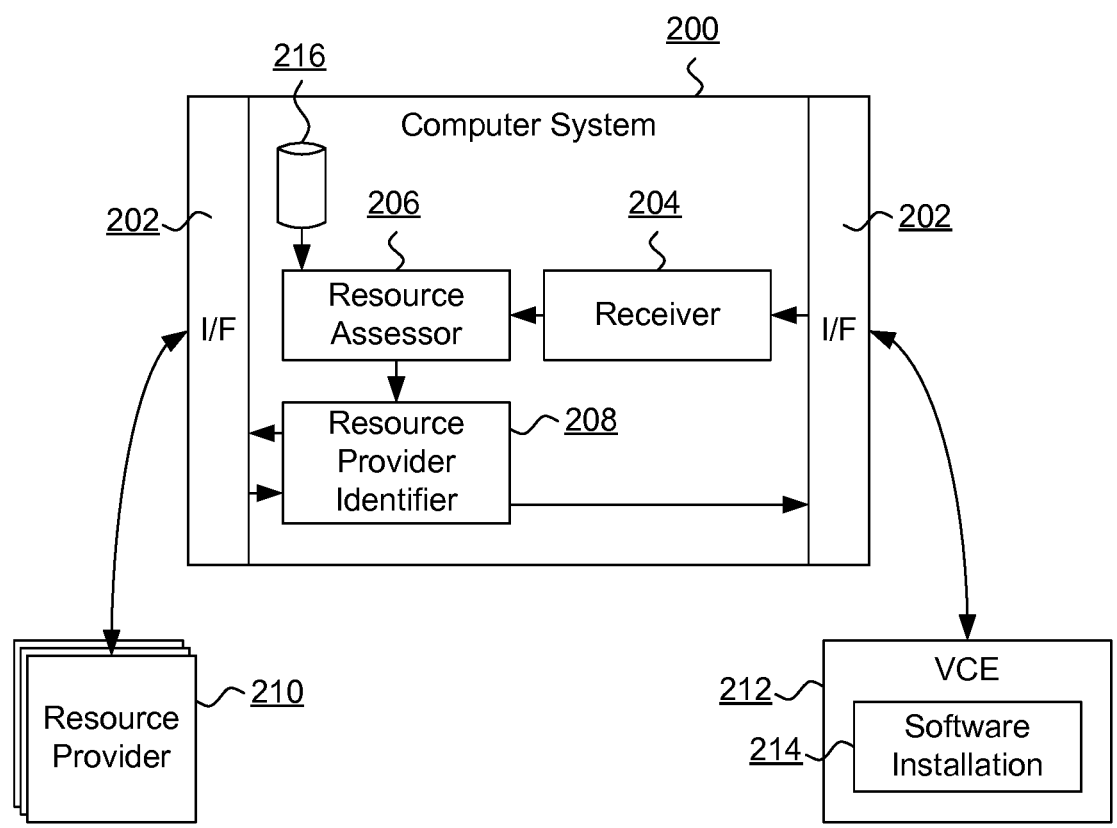
FIG. 2 is a component diagram of an exemplary computer system arrangement for provisioning a resource to a virtualized software installation in accordance with an embodiment of the present disclosure.

FIG. 2 is a component diagram of an exemplary computer system arrangement 200 for provisioning a resource to a virtualized software installation 214 in accordance with an embodiment of the present disclosure. A virtualized computing environment 212 is an environment for the deployment of software installations such as installation 214. Software installations can include software virtualizations of physical machines, application deployments, services and the like. For example the virtualized computing environment 212 can be provided as a particular operating system executing within a virtual machine with a hypervisor on a hardware device or, potentially, a distributed arrangement of hardware devices. The virtualized computing environment 212 can be provided as a service-based technology such that the environment 212 is delivered as a service for the installation and execution of one or more software applications or services. In a preferred embodiment, the virtualized environment 212 is provided as part of a Cloud Computing service provided by a Cloud Computing service provider such as BT Cloud Compute available from British Telecommunications plc. Additionally or alternatively, the virtualized computing environment 212 can be provided as, or operate with, a service based infrastructure and/or platform such as IaaS and/or PaaS.

Deployment of the software installation 214 includes any or all of installing, configuring, arranging and adapting one or more software components such that the installation 214 is executable with the virtualized computing environment 212. For example, a web based software application can be installed to execute with an operating system executing on a virtual machine, the virtual machine being configured to include networking facilities and the virtual machine also having installed thereon a web server having a certain configuration, a database and certain other requirements defined for the application. All such installation and configuration such that the web based software application is executable in the virtualized computing environment 212 is part of the deployment of the application as a software installation 214.

The software installation 214 has associated a deployment specification such as a functional definition, component list or similar that is suitable for use in deploying, updating, refreshing or executing the software installation 214 with the virtualized computing environment 212. For example, a deployment specification can include a specification of an architecture of the software installation 214 and/or an architecture of software components required for the installation 214. Additionally or alternatively, the deployment specification 204 can include specifiers or descriptors of application or other software or platform components that are required for the deployment of the installation 214.

In some embodiments the virtualized computing environment 212 is provided as, or operates with, a service based infrastructure and/or platform such a Cloud Computing service, an IaaS service and/or a PaaS service. In such embodiments a deployment specification is further suitable for use in deploying, refreshing, updating or executing the software installation 214 with such services.

The deployment specification identifies one or more functional requirements for the deployment, updating, refreshing or executing of the installation 214 such that the application executes with the virtualized computing environment 212. Functional requirements are specifications of functions, features, components, facilities or services required for the software installation 214. For example, functional requirement can include: application of a particular security policy; a particular middleware architecture and configuration; a particular file storage mechanism such as a particular file system or data storage arrangement; a particular database architecture; a particular processing capability such as a particular processing performance or capacity; and other such functional requirements. By way of example, a functional requirement can be defined to implement a security policy for a software installation 214 in which all data is encrypted using a particular standard of encryption. Computing resources in the distributed computing environment employed to satisfy functional requirements of the installation 214. Thus a functional requirement to encrypt data can be satisfied by an encryption service, function, module or component of a resource provider 210 from potentially many such resource providers 210 in the distributed computing environment.

A resource provider 210 is a physical or virtualized computer system or multiple computer systems communicatively connected in or to the distributed computing environment and adapted to provide resources to consuming systems such as the software installation 214. The resources provided by resource providers 210 are employed by the software installation 214 to satisfy functional requirements of the software installation 214.

Resources can include functions, dataflows and/or technologies. Examples of function resources include bespoke functions, procedures, modules or components provided for resource consumers, such as a library containing functions embodying or supporting the a software component or a class of instantiable objects providing methods and routines of or for resource consumers. Examples of dataflow resources include communications between software components such as the invocation of a function, routine or method of a first component by a facility of a second component. A further example of a dataflow resource is a coupling between two or more components such that messages are passed, requests are sent or data is shared between the two components. Such components can be internal to a resource consumer, part of a virtualized computing environment 212 or external to the resource consumer and the virtualized computing environment 212. Examples of technology resources include particular software components, applications or facilities to be installed to deploy a software installation 214. For example, a technology resource can be a database software component from a particular technology vendor at a particular version, release or level. Further examples of technology resources include intrusion detection or prevention technologies, virus scanning technologies such as antivirus software, web servers, operating systems, middleware, encryption and message handling technologies.

Thus, resources can include, inter alia, software or hardware components, software packages, modules, applications, services or solutions, networking facilities, protocols, storage facilities including databases, middleware facilities, user interface facilities and connectivity services. A deployment specification defining functional requirements may explicitly identify resources such as an explicit identification of a particular database or web server facility. Alternatively or additionally, a deployment specification can be suitable for identifying a resource such that the identification is not explicit but is discernible. For example, an explicit identification of a web server resource for a software installation 214 further identifies dataflows between web page repositories, server side script repositories and the web server. Such dataflows are identified by a deployment specification while such identification is not necessarily explicit. In all cases a deployment specification identifies functional requirements which require resources for their satisfaction.

In one exemplary embodiment a functional requirement for a software installation 214 has associated one or more characteristics. For example, a functional requirement to implement an encryption security policy may further characterize the security policy by specifying characteristics of the policy, such as an encryption algorithm and key size. Such characteristics associated with functional requirements can require specific resources. For example, an encryption service operating with a 128 bit key length will be less computationally intensive than an encryption service operating with a 256 bit key length. Accordingly a functional requirement for an encryption service having a characteristic defining a 256 bit key length requires more processor resource than one having a characteristic defining a 128 bit key length.

The computer system 200 of FIG. 2 includes an interface 202 for communication with resource providers 210 and resource consumers such as the software installation 214. The computer system 200 further includes a receiver 204 as a software, hardware, firmware or combination component for receiving a functional requirement for the software installation 214. The functional requirement may be received directly from the software installation 214 or from the virtualized computing environment in which the software installation 214 is deployed or to be deployed. Alternatively the functional requirement can be received from a different component or system that is functional to configure, deploy, execute or service the software installation 214 such as a deployment component or the like. The functional requirement requires one or more resources of one or more resource providers 210 for fulfillment.

The computer system 200 further includes a resource assessor 206 as a software, hardware, firmware or combination component including logic adapted to determine an amount of each resource required to fulfill or satisfy the functional requirement as an extent of each resource. In an exemplary embodiment the resource assessor 206 is further adapted to determine which resources are required to fulfill or satisfy the functional requirement, such as where the resource requirements are not explicitly identified in a functional requirement or where resource requirements are ambiguous based on the functional requirement.

In one embodiment the resource assessor 206 determines the extent of each resource required (and optionally which resources are required) using a directory 216. The directory is a data store suitable for holding functional requirement information such that a set of one or more resources required to fulfill or satisfy a resource requirement can be determined along with an extent (or amount) of each resource that is required to fulfill or satisfy the resource requirement. For example the directory can be stored in a volatile or non-volatile storage, as files, in a registry or a database or other suitable directory storage means. Examples of suitable data structures of the directory 216 are considered below with reference to FIGS. 3 and 4.

Figure 3:
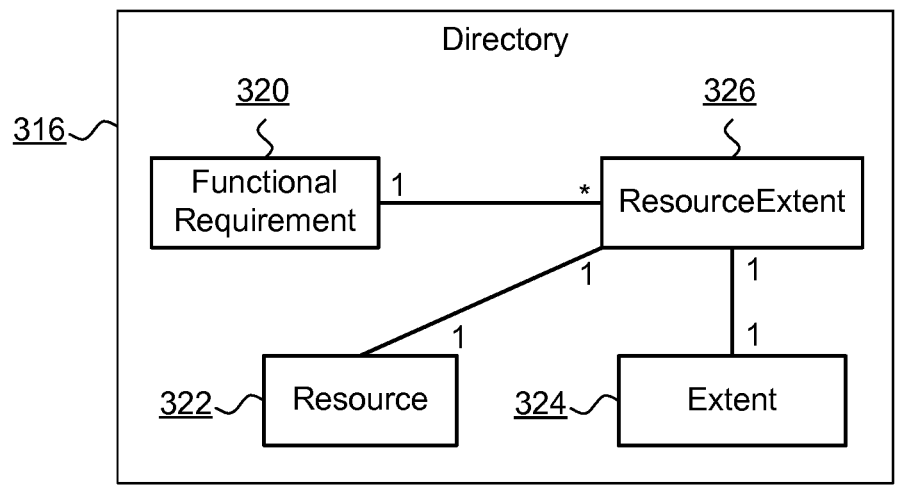
FIG. 3 is an exemplary schematic data definition of a directory in accordance with an embodiment of the present disclosure.

FIG. 3 is an exemplary schematic data definition of a directory 316 in accordance with an embodiment of the present disclosure. The data structure of the directory 316 of FIG. 3 associates a functional requirement 320 directly with any number of ResourceExtent 326 data structures. A ResourceExtent 326 data structure is a holding data structure associating a single resource 322 with a single extent 324 (indicating an amount of the resource 322). Accordingly, by a set of resources 322 required to fulfill or satisfy a functional requirement 320 can be determined by reference to the set of ResourceExtent 326 data structures. Thus each resource 322 indicated in a ResourceExtent 326 for a functional requirement 320 has associated a resource extent 324 indicating an amount, extent or degree of the resource 322 required to fulfill or satisfy the functional requirement 320. It will be appreciated that the measure of an extent 324 of a resource 322 required to fulfill or satisfy a functional requirement 320 will depend on the nature of the resource. For example, a processor resource may be consumed according to a particular processing rate, for a particular period of time (whether in one block, spread over multiple operations or repeatedly), a number of processors, a number of processor cores, or other extents of consumption of processor resource. On the other hand, for example, a storage device may be consumed up to a certain amount of data. An extent of consumption of other resources can be expressed similarly depending on the resource type. Thus the directory of FIG. 3 provides a relationship between a functional requirement, resources and an extent of consumption of those resources such that the resource assessor 206 is able to determine an extent of a resource required to implement the functional requirement.

Figure 4:
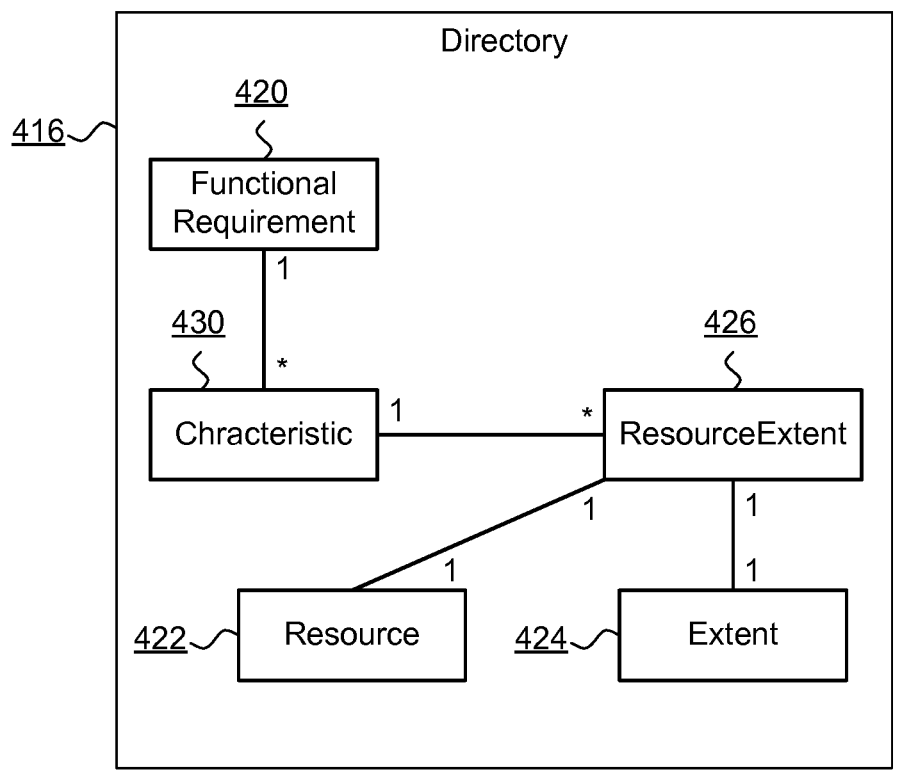
FIG. 4 is an alternative exemplary schematic data definition of a directory in accordance with an embodiment of the present disclosure.

FIG. 4 is an alternative exemplary schematic data definition of a directory 416 in accordance with an embodiment of the present disclosure. Many of the features of FIG. 4 are identical to those described with respect to FIG. 3. FIG. 4 differs to FIG. 3 in that a functional requirement 420 is not directly associated with a ResourceExtent 426. In contrast, in FIG. 4, a functional requirement is associated with any number of characteristics 430 which are each associated with any number of ResourceExtent 426 data structures. Each characteristic 430 corresponds to a feature, attribute, sub-requirement or parameter of a functional requirement 420 such that the functional requirement 420 is characterized. Accordingly, the resources 422 and the extent 424 of their consumption required for a resource requirement 420 can vary in dependence on the particular characteristics 430 selected for the resource requirement. By way of practical example, a functional requirement 420 can be a requirement for encryption, having a characteristic 430 of a key length of 256 bits which requires a processor resource 422 operating at a particular speed for a particular duration (extent 424).

It will be appreciated by those skilled in the art that the directories of FIG. 3 and FIG. 4 are purely exemplary and alternative arrangements could be employed. Further, it will be appreciated that a combination of the data schemas of FIGS. 3 and 4 could be employed such that certain functional requirements have a direct mapping to a resource (such as via only a single placeholder characteristic) while others have associated characteristics.

Returning to FIG. 2, the resource assessor 206 thus determines an extent of the resource required to implement the functional requirement for the software installation 214 and provides resource and extent information to a resource provider identifier 208.

The resource provider identifier 208 is a software, hardware, firmware or combination component including logic adapted to identify resource providers 210 in the distributed computing environment having availability of each of the required resources to the determined extent. It will be appreciated that different resources could be provided by different resource providers 210 such that a combination of the resources from different providers 210, when taken together, provides all the resources required to fulfill or satisfy a functional requirement. In an exemplary embodiment, the resource provider identifier 208 identifies resource providers having availability of the required resources to the required extent by polling the resource providers 210 for availability of each resource and receiving resource availability information from resource providers 210. Accordingly, in such an exemplary embodiment, the resource provider identifier 208 is further adapted to determine one or more resource providers 210 suitable for providing the required resources to the required extent based on the information returned thereby.

In an alternative exemplary embodiment the resource provider identifier 208 identifies resource providers having availability of the required resources to the required extent by sending a request to each of at least a subset of the resource providers 210 indicating one or more of the required resources and corresponding extents and receiving an indication directly from resource providers 210 indicating availability of the resource and extent.

On identification of resource providers 210 having available resources to the required extent the computer system 200 communicates an indication of the identified resource providers 210 to the software installation 214 (or, in alternative arrangements, the component from which the functional requirement was received) in order that the resources can be provided to the software installation 214 to fulfill or satisfy the functional requirement of the software installation 214. Thus in this way embodiments of the present disclosure determine an amount or extent of resources required to fulfill or satisfy a functional requirement of a software installation 214. Accordingly over-consumption of resources can be mitigated based on the determined extent of resource consumption required. Furthermore overprovision of resources can be mitigated by indication to resource providers 210 of an extent of consumption required to fulfill or satisfy a functional requirement.

In one embodiment the computer system 200 makes or proposes an association between one or more identified resource providers 210 and the software installation 214 such that the software installation 214 consumes resources from the identified resource providers 210. The association can be formalized as a data structure defining the service provider(s) 210, the software installation 214, the resource(s) for consumption and the extent of such consumption. Such a data structure can constitute an agreement between the resource provider(s) 210 and the software installation 214. Thus the data structure defines, on one hand, the resources and extent (amount) of those resources assured to be made available by the resource provider(s) 210, and on the other hand, the resources and extent (amount) of those resources that will be consumed by the software installation 214. Such a data structure can be recorded in a manner that mitigates repudiation of this association or agreement, for example by recording in a distributed sequential transactional database such as a blockchain data structure.

Distributed sequential transactional databases are well known in the field of crypto-currencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain though it will be appreciated that other suitable databases, data structures or mechanisms possessing the characteristics essential for embodiments of the present disclosure could alternatively be used. A blockchain is a distributed chain of block data structures accessed by a network of nodes, referred to here as a miner network. Each block in the blockchain includes a plurality of transaction data structures, each transaction referring or relating to a prior transaction. For example, in a preferred embodiment each blockchain includes a Merkle of hash or digest values for transactions included in the block to arrive at a hash value for the block, which is itself combined with a hash value for a preceding block to generate a chain of blocks (blockchain). A new block of transactions is added to the blockchain by miner software, hardware, firmware or combination systems in a miner network. The miners are communicatively connected to sources of transactions (such as the computer system 200 generating associations between resource provider(s) 210 and a consuming software installation 214) and access or copy the blockchain. A miner undertakes validation of the substantive content of a transaction (such as the criteria defined therein) and adds a block of new transactions to the blockchain when a challenge is satisfied, typically such challenge involving a combination hash or digest for a prospective new block and a preceding block in the blockchain and some challenge criterion. Thus miners in the miner network may each generate prospective new blocks for addition to the blockchain. Where a miner satisfies or solves the challenge and validates the transactions in a prospective new block such new block is added to the blockchain. Accordingly a blockchain provides a distributed mechanism for reliably verifying a data entity such as an entity constituting or representing an association between resource provider(s) 210 and resource consumers such as software installation 214. The detailed operation of such blockchains and the function of miners in a miner network is beyond the scope of this specification. The manner in which a blockchain and network of miners operate ensures that only valid transactions are added within blocks to the blockchain in a manner that is persistent within the blockchain. Transactions added erroneously or maliciously are not verifiable by other miners in the network and cannot persist in the blockchain. This attribute of blockchains can be exploited by embodiments of the present disclosure to provide a distributed and reliable assurance for resource provider(s) 210 and resource consumers such as software installation 214 that resource consumption by a consumer is in accordance with an association or agreement recorded in the blockchain.

FIG. 5 is a flowchart of an exemplary method of the computer system of FIG. 2 in accordance with an embodiment of the present disclosure. Initially at 502 the method receives a functional requirement for the software installation 214. At 504 the method determines an extent of the resource required to implement the functional requirement. At 506 the method identifies one or more resource providers in the distributed computing environment having availability of the required resource to the determined extent. Finally at 508 the method communicates an indication of the identified resource providers to the software installation in order that the resource can be provided to the software installation to the determined extent to provide the functional requirement.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method to provide a resource to a
virtualized software installation in a distributed computing environment, the method comprising:
receiving a functional requirement for the software installation;
determining an extent of a resource required to implement the functional requirement; identifying one or more resource providers the distributed computing environment having availability of the required resource to the determined extent; and
communicating an indication of the identified one or more resource providers to the software installation in order that the resource can be provided to the software installation to the determined extent to provide the functional requirement; and
wherein the functional requirement has one or more characteristics which are associated with the functional requirement, and determining an extent of a resource required insides:
accessing a directory of functional requirement characteristics, the directory defining, for each of the one or more characteristics, an extent of the resource required to provide a functional requirement having the characteristic.

2. The method of claim 1, wherein determining an extent of a resource required includes accessing a directory of functional requirements, the directory defining, for each functional requirement, an extent of the resource required to implement the function.

3. The method of claim 2, wherein the functional requirement includes a function of a security policy.

4. The method of claim 2, wherein the functional requirement is an entry in a deployment descriptor for one or more software components for execution for the software installation.

5. The method of claim 1, wherein identifying one or more resource providers includes:
polling one or more resource providers for availability of the resource at each provider;
receiving resource availability information from the one or more resource providers; and
determining the one or more resource providers suitable for providing the resource to the required extent.

6. The method of claim 1, wherein identifying resource providers includes:
sending a request to each of one or more resource providers including an indication of the required resource and the determined extent; and
receiving an indication from each of the one or more providers that the provider has availability of the required resource to the determined extent.

7. A computer system to provide a resource to a virtualized
software installation in a distributed computing environment, the system comprising:
a receiver including logic adapted to receive a functional requirement for the software installation;
a resource assessor including logic adapted to determine an extent of a resource required to implement the functional requirement;

a resource provider identifier including logic adapted to identify one or more resource providers in the distributed computing environment having availability of the required resource to the determined extent; and an interface via which an indication of the identified resource providers is communicated to the software installation in order that the resource can be provided to the software installation to the determined extent to provide the functional requirement; and wherein the functional requirement has one or more characteristics which are associated with the functional requirement, and determining an extent of a resource required includes:

accessing a directory of functional requirement characteristics, the directory defining, for each of the one or more characteristics, an extent of the resource required to provide a functional requirement having the characteristic.

8. A non-transitory computer-readable computer program element comprising computer program code to, when loaded into a computer system and executed thereon, cause the computer to perform the method as claimed in claim 1.

\* \* \* \* \*